(12) United States Patent
Scheck et al.

(10) Patent No.: US 7,404,475 B2
(45) Date of Patent: Jul. 29, 2008

(54) BIDIRECTIONAL DRIVE

(75) Inventors: Georg Scheck, Weitramsdorf (DE);
Frieder Krüger, Grub (DE); Marcus Klopp, Coburg (DE); Stephanie Angermüller, Weidhausen (DE);
Matthias Weiss, Rödental (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 281 days.

(21) Appl. No.: 10/552,325

(22) PCT Filed: Apr. 8, 2004

(86) PCT No.: PCT/DE2004/000797

§ 371 (c)(1),
(2), (4) Date: Oct. 7, 2005

(87) PCT Pub. No.: WO2004/094854

PCT Pub. Date: Nov. 4, 2004

(65) Prior Publication Data

US 2006/0213740 A1    Sep. 28, 2006

(30) Foreign Application Priority Data

Apr. 22, 2003  (DE)  ................................ 103 18 894

(51) Int. Cl.
*F16D 41/20* (2006.01)
(52) U.S. Cl. ........................................ 192/223; 192/19
(58) Field of Classification Search ................. 192/223, 192/223.4, 15, 19, 37, 77, 78
See application file for complete search history.

(56) References Cited

U.S. PATENT DOCUMENTS 453,587 A  *  6/1891  Nuting  ........................ 192/43

(Continued)

FOREIGN PATENT DOCUMENTS

DE    30 28 012 A1    2/1982

(Continued)

OTHER PUBLICATIONS

International Search Report dated Nov. 16, 2004 corresponding to PCT/DE2004/000797.

(Continued)

*Primary Examiner*—Richard M Lorence
(74) *Attorney, Agent, or Firm*—Christie, Parker & Hale, LLP.

(57) ABSTRACT

The invention relates to a bidirectional drive for rotating in the one or the other direction of drive a drive wheel which is linked with an adjusting device. The bidirectional drive includes a drive lever which can be rotated about a drive axis, starting from an initial position, in the one or the other direction. The lever is linked with a coupling element for expanding a spring element that is at least partially supported by the cylindrical drive surface of the drive wheel and that entrains the drive wheel in the peripheral direction when the drive lever is moved away from the initial position, while the spring element is no longer supported by the cylindrical drive surface of the drive wheel and the drive wheel is not entrained when the drive lever is returned to the initial position. The coupling element includes expansion cams that can be tilted about an axis spaced apart from the drive axis. The expansion cams expand the actuation lever which is linked with the spring element in such a manner that the spring element which is supported by the cylindrical drive surface of the drive wheel is expanded.

22 Claims, 6 Drawing Sheets

U.S. PATENT DOCUMENTS

| | | | |
|---|---|---|---|
| 4,533,027 A | | 8/1985 | Otani et al. |
| 5,382,076 A | | 1/1995 | Scheck et al. |
| 6,604,619 B1 | | 8/2003 | Scheck et al. |
| 6,648,119 B1 | * | 11/2003 | Klingler ................. 192/223 |
| 7,051,860 B2 | * | 5/2006 | Scheck et al. ........... 192/223 |
| 2001/0042670 A1 | * | 11/2001 | Schuster ................. 192/223 |

FOREIGN PATENT DOCUMENTS

| | | |
|---|---|---|
| DE | 33 28 660 A1 | 2/1984 |
| DE | 43 09 334 A1 | 9/1993 |
| DE | 44 05 870 A1 | 8/1995 |
| DE | 198 55 285 A1 | 6/2000 |
| DE | 199 07 483 A1 | 8/2000 |
| EP | 1059195 A2 * | 12/2000 |

OTHER PUBLICATIONS

English translation of the International Preliminary Examination Report for corresponding PCT application No. PCT/DE2004/000797 dated Mar. 2, 2006.

* cited by examiner

BIDIRECTIONAL DRIVE

CROSS-REFERENCE TO RELATED APPLICATION

This application is a National Phase Patent Application of International Application Number PCT/DE2004/000797, filed on Apr. 8, 2004, which claims priority of German Patent Application 103 18 894.0, filed on Apr. 22, 2003.

BACKGROUND

The invention relates to a bidirectional drive for rotating a drive wheel connected to an adjusting device.

From German Patent Application No. 198 55 285 A1 a bidirectional manual drive is known for generating a rotational movement which starting from a zero point position of a drive lever which is able to swivel about a drive axis follows selectively in one or other rotational direction. During rotation of the drive lever from the neutral position contact bearing faces of circular section shaped coupling elements bear with force locking engagement against the opposing partially circular shaped faces of a cylindrical drive face of an output element and entrain the output element in the circumferential direction whilst during return of the drive lever into the neutral position the force locking engagement of the coupling elements against the cylindrical shaped drive face is lifted so that the output element is not entrained.

A bidirectional adjusting device known from German Patent No. 199 07 483 C2 for generating a rotational movement has a housing in which are mounted a drive element, an output element which can be angularly adjusted by actuating the drive element, and a loop spring with several windings which are supported on the inside wall of the housing and block any torque introduced from the output side whilst in the event of torque introduced on the drive side they trigger the transfer of torque from the drive element to the output element. The angled ends of the loop spring are connected to a transfer element mounted between the drive element and output element.

Through a dynamic reversal a bidirectional drive can be produced from this torque lock wherein the output element is connected to a drive lever and the cylindrical housing is replaced by a cylindrical drive wheel so that during swivel movement of the drive lever the loop spring is expanded through the transfer element from the drive lever and transfers the swivel movement of the drive lever to the cylindrical inside face of the drive wheel.

With the known bidirectional drives high flat surface pressures occur as a result of a linear bearing of the transfer elements which are designed as circular section shaped coupling elements against the drive face. The use of a loop spring requires several windings to provide sufficient force locking engagement of the loop spring against the cylindrical inside face of the output element. Nevertheless as a result of the forces which have to be applied when transferring torque there is the danger that in the event of overload the angled loop spring ends are bent round so that the bidirectional drive becomes unable to function.

It is therefore the object of the present invention to provide a bidirectional drive of the type mentioned at the beginning for turning a drive wheel connected to an adjusting device which enables torque transfer from the drive lever to the drive wheel with slight surface pressure of the force transfer elements, which has a very simple compact structure with a high service life and which is cost-effective to manufacture.

BRIEF DESCRIPTION

The solution according to the invention enables torque transfer from the drive lever to the drive wheel with slight surface pressure of the force transfer elements and has a simple space-saving construction with a high service life and is cost-effective to manufacture.

Through the expansion of the spring element over a wide contact surface area against the cylindrical drive face of the drive wheel as well as through the expansion cams of the coupling element which are able to tilt about an axis spaced from the drive axis a force-locking engagement is produced to transfer torque from the drive lever to the drive wheel over a wide contact surface area and therefore with low surface area pressure.

Since only some few component parts are required for the force transfer from the drive lever to the drive wheel the bidirectional drive can be manufactured simply and cost-effectively.

The expansion cams are preferably arranged at different radial distances from the drive axis on the drive lever so that the expansion cams during swivel movement of the drive lever about the drive axis complete a tilting movement whereby the actuation levers which are connected to the spring element are expanded and the spring element is expanded to bear against the cylindrical drive face of the drive wheel.

For a play-free contact bearing of the expansion cams against the expansion faces of the actuation levers at least one expansion cam is designed pretensioned wedgeshaped and mounted radially displaceable between two contra-rotating wedge faces of the expansion faces of the actuation levers but is supported with self-locking action opposite the other expansion cam.

The other expansion cam is also preferably designed wedge-shaped with oppositely aligned wedge form and is clamped between counter wedge faces of the actuation levers.

In order to secure a slight readjustment of the expansion cams for play-free contact earing against the expansion faces of the actuation levers on the one hand and to secure the self-locking action between the mutually radially tensioned expansion cams with a force-free contact of the wedge faces of the actuation levers against the contact faces of the wedged expansion cams on the other hand the contact faces and the wedge faces have a lower coefficient of friction than the opposite support of the wedgeshaped expansion cams.

In order to increase the self-locking action the opposite support of the wedge-shaped expansion cams can be formed wedge-shaped with a wedge angle which is less than the wedge angle included between the contact faces of the wedge shaped expansion cams and the wedge faces of the actuation levers, more especially half the size.

The solution according to the invention allows several different embodiments which serve the same principle. A first embodiment is characterized in that the spring element consists of a spring strip whose ends are angled parallel to each other and are inserted in sockets in the actuation levers.

The actuation levers can be disc-shaped and have a peripheral surface area which is adapted at least in part to the cylindrical inside wall of the drive wheel.

In an alternative embodiment the actuation levers can consist of a one-piece spring-elastic expansion lever which holds the expansion cams and drive axis and has on the side opposite the expansion cams in relation to the drive axis an elastic web which takes up the tension forces.

In a further alternative the expansion lever and a circumferential face adapted to the drive surface of the drive wheel can be combined into one moulded part which consists of a stamped steel part, a plastics part or a sintered part and is inserted without pretension into the inside face of the drive wheel.

Resetting springs can be mounted between the actuation levers or the expansion lever so that the actuation levers or the expansion lever move the expansion cams after swivel movement of the drive lever back into an initial position which corresponds to the neutral position of the drive lever.

To reset the drive lever after a swivel movement into the neutral position a lever resetting spring is mounted between the drive lever and a locally fixed stop on the housing of the bidirectional drive.

With the embodiments mentioned above the drive lever has a link designed as an oblong hole on to the drive axis in order to ensure the required motion play during expansion of the actuation lever or cross stay.

In a further variation of the solution according to the invention which can be applied to both embodiments above the expansion cams are mounted in different radial distances from the drive axis on a reinforcement lever supported with swivel action on the drive lever so that the required motion play is set up by the reinforcement lever whilst the drive lever can be attached to the drive axis free of play and is consequently optimally centered.

The connection of the reinforcement lever to the drive lever can be arranged radially in alignment with the expansion cams and can be provided either on the same side in relation to the drive axis as the expansion cams or on the side of the reinforcement lever opposite the expansion cams in relation to the drive axis.

BRIEF DESCRIPTION OF THE DRAWINGS

The invention will now be explained in further detail with reference to several embodiments and to the figures in the drawings.

DETAILED DESCRIPTION OF THE DRAWINGS

Figure 1:
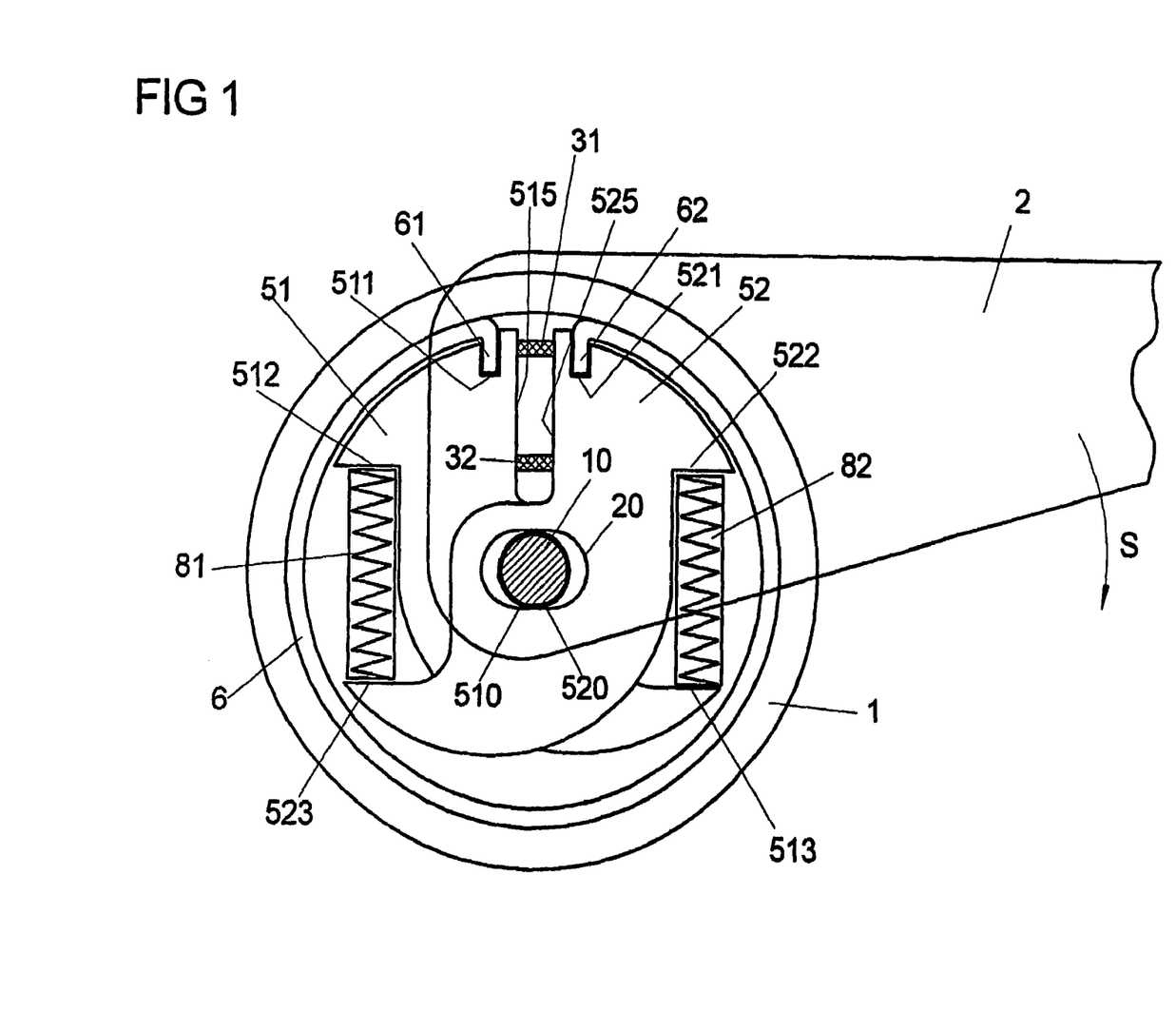
FIG. 1 is a sectional view of a bidirectional drive with a spring strip and actuation discs.

The bidirectional drive illustrated in FIG. 1 has a drive lever 2 which is capable of swiveling about a drive axis 10 and which is attached through an oblong hole 20 to the drive axis 10 free of play. A swivel movement of the drive lever 2 in the direction of the arrow S registered on the drive lever 2 or in a counter direction leads to a rotational movement of a drive wheel 1 which has a cylindrical drive face inside which is mounted a transfer device which transfers the torque generated through the swivel movement of the drive lever 2 to the drive wheel 1 and thereby entrains the drive wheel 1 in the swivel direction of the drive lever in the circumferential direction when the drive lever 2 is moved away from a neutral position whilst the drive wheel 1 is not entrained during return of the drive lever 2 back into the neutral position.

The sectional view of the bidirectional drive according to FIG. 1 only shows the elements of the bidirectional drive which are of significance for the present invention. Where applicable further elements are provided such as distance sleeves or spacer discs, more particularly a brake housing (not shown in FIG. 1) is provided in which a brake device is mounted which is connected to the drive wheel 1 so that torque transfer on the output side is blocked whilst the locking action is lifted in the event of torque transfer on the drive side. The brake device thus prevents displacement of the bidirectional drive when external forces appear. In particular it ensures that in the event of crash forces occurring the drive wheel 1 is prevented from turning.

The transfer device contains a spring strip 6 as well as two actuation discs 51, 52 mounted on the drive axis 10 with spring strip sockets 511, 521 in which are inserted the spring ends 61, 62 of the spring strip 6 which are angled parallel to each other. Furthermore the transfer device contains a coupling element in the form of two expansion cams 31, 32 mounted with slight play between the actuation discs 51, 52 and connected to the drive lever 2, more particularly forming part of the drive lever 2, so that during swivel movement of the drive lever 2 they tilt about a virtual axis which is spaced from the drive axis 10. The expansion cams 31, 32 bear against the expansion faces 515, 525 of the actuation discs 51, 52 which they force apart during swivel movement of the drive lever 2 and as a result of the ensuing tilting movement about the virtual axis which lies outside of the drive axis 10 so that the spring strip 6 is expanded over the spring strip sockets 511, 521 and thus the swivel movement of the drive lever 2 is converted through entrainment of the drive wheel 1 into a rotation of the drive wheel 1 into the swivel direction of the drive lever 2.

If the friction between the spring strip 6 and drive wheel 1 is comparatively low then to generate sufficiently large tension forces the distance between the cams 31, 32 can be reduced. This gives rise to relatively large pressure forces of the cams 31, 32 on the expansion faces 515, 525 of the actuation discs 51, 52 which requires corresponding stable dimensions. The angular clearance on the drive lever 2 is also unfavorably affected if the distances between the cams 31, 32 are small. Therefore the largest possible distance between the cams 31, 32 is selected in dependence on the relevant friction conditions between the spring strip 6 and drive wheel 1 so that the outer cam 31 is mounted radially as far out as possible.

In order to reset the transfer device and thus the drive lever 2 into the neutral position two resetting springs 81, 82 are provided which are supported on bearings 512, 513 and 522, 523 of the actuation discs 51, 52 and on bearings fixed on the housing. The resetting force which is to be applied by the resetting springs 81, 82 can be kept small. With relative movement of the actuation discs 51, 52 caused through the expansion cams 31, 32 the resetting springs 81, 82 are tensioned to expand the spring strip 6 and are consequently relaxed during return of the drive lever 2 into the neutral position until the drive lever 2 has reached the neutral position.

An additional pretensioning of the spring strip 6 is not necessary in the arrangement illustrated in FIG. 1 since the resetting springs 81, 82 produce the pretension required by the spring strip 6 when the drive lever 2 is actuated so that the spring torque produces the contact bearing moment of the cams 31, 32.

If the drive lever 2 is actuated in the direction of the arrow S then a torque is exerted on the expansion cams 31, 32 which forces the actuation discs 51, 52 and thus the spring strip 6 apart and entrains the drive wheel 1 through the friction. The oblong hole 20 in the drive lever 2 ensures free movement at this point.

Figure 2:
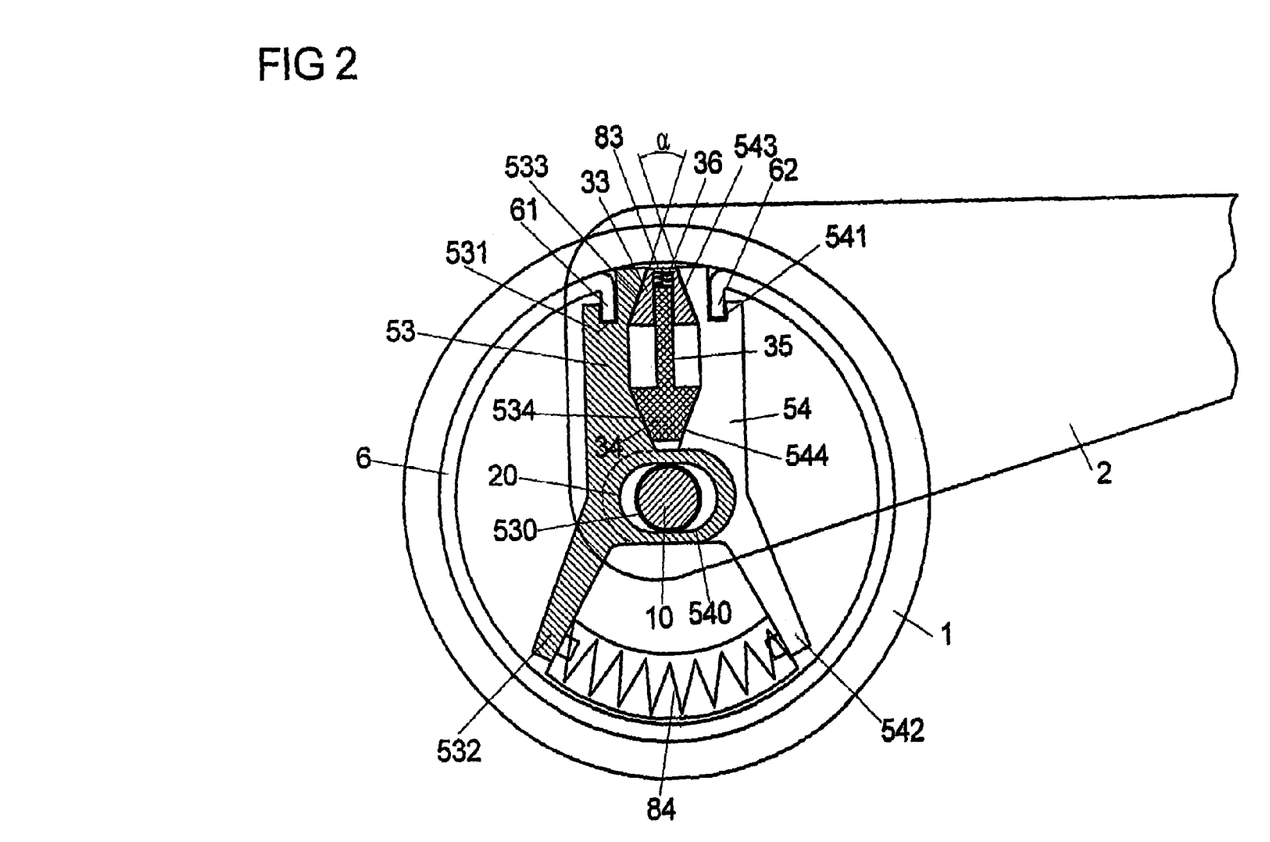
FIG. 2 is a sectional view of a bidirectional drive with a spring strip, actuation levers and wedge shaped expansion cams.

FIG. 2 shows in a sectional view of a bidirectional drive a modified transfer device with a play-free connection of expansion cams 33, 34 with actuation levers 53, 54 for expanding a spring strip 6 in the event of torque transfer from the drive lever 2 to the drive wheel 1.

The expansion cams 33, 34 are in this embodiment designed wedge-shaped and bear against the wedge faces 533, 543 and 534, 544 of the expansion faces of the actuation levers 53, 54 which are supported free of play by bores 630, 540 on the drive axis. The expansion cam 34 which is mounted at the lesser distance from the drive axis 10 has a web 35 which is inserted by its wedge-shaped end into a wedge-shaped recess 36 of the wedge-shaped expansion cam 33 which is disposed at the greater distance from the drive axis 10 and which (web 35) is supported by a spring 83 against the expansion cam 33. The expansion cam 34 closer to the drive axis 10 together with the web 35 are part of the drive lever 2 which is supported through an oblong hole 20 on the drive axis 10.

Through the friction conditions between the contact faces of the wedge-shaped expansion cams 33, 34 and the opposing wedge faces 533, 543 and 534, 544 of the expansion faces of the actuation levers 53, 54 on the one hand and the adjoining wedge faces of the recess 36 of the outer expansion cam 33 and web 35 and through the corresponding wedge angle it is ensured that the expansion cams 33, 34 are adjusted self-locking through the compression spring 83 during actuation of the drive lever 2 and consequently take out any play conditioned through tolerances and wear of the structural parts whilst during the resetting through the resetting spring 34 the wedge faces 533, 543 of the actuation levers 53, 54 press against the smooth wedge faces of the expansion cam 33 and the latter can radially escape conditioned through the wedge angle a whereby the loop spring 6 can lift off from the cylindrical inner wall of the drive wheel 1 so that resetting is not impeded. The self locking action which prevails during actuation is thus lifted during resetting of the drive lever 2.

For this purpose the surfaces in the recess 36 of the outer expansion cam 33 as well as the corresponding contact surface of the web 35 have rough surfaces as well as the half wedge angle a12 in respect of the wedge angle a of the wedge faces 533, 543 and 534, 544 and contact faces of the expansion cams 33, 34 which bear against one another with smooth faces and can consequently slide along each other without any self-locking action.

The spring strip 6 is inserted by its parallel angled ends 61, 62 into spring strip sockets 531, 541 of the actuation levers 53, 54 which have at their side opposite the drive axis 10 arms 532, 542 between which is a resetting spring 84 which in addition bears against bearings fixed on the housing so that during swivel movement of the drive lever 2 and the relative movement of the actuation levers 53, 54 resulting therefrom the resetting spring 84 is tensioned.

Figure 3:
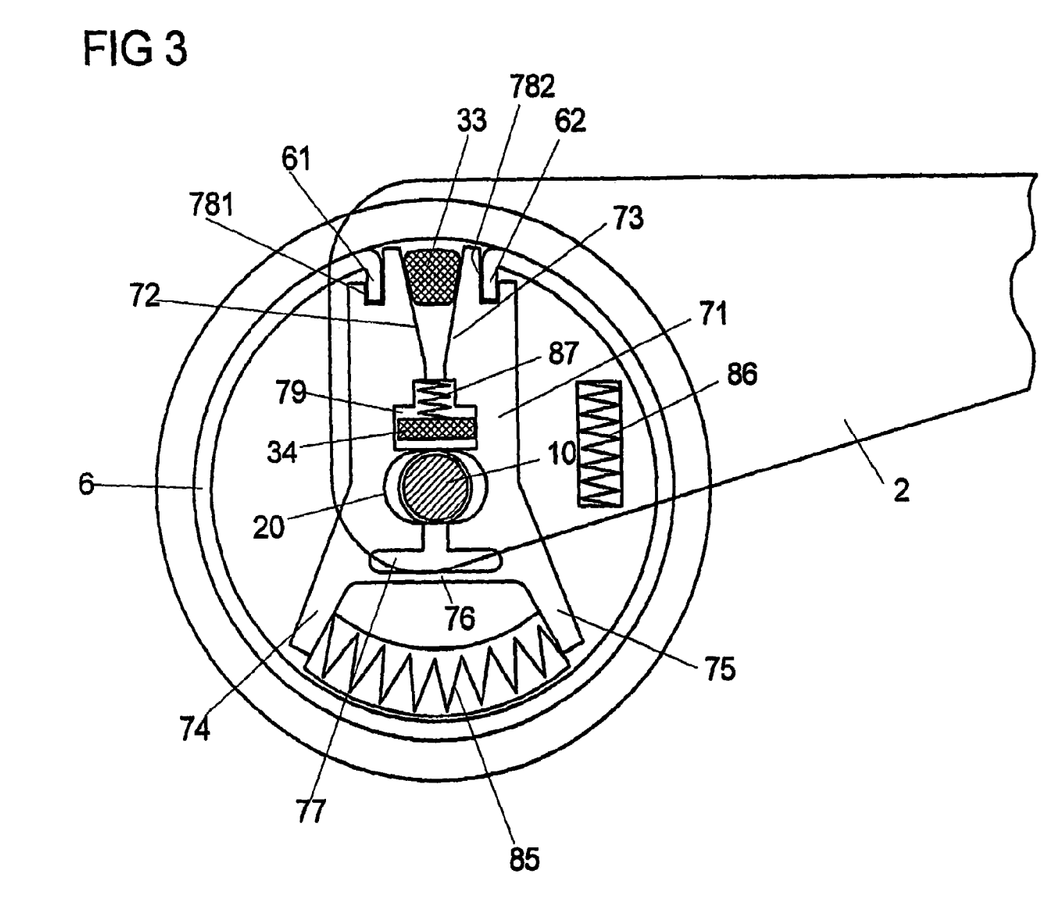
FIG. 3 is a sectional view of a bidirectional drive with an elastic shaped part and a spring strip.

The sectional view illustrated in FIG. 3 of a bidirectional drive has in place of two actuation levers mounted without play on the drive axis 10 a one-piece spring-elastic expansion lever 71 with wedge-shaped expansion faces 72, 73 between which is a wedge-shaped expansion cam 33 connected to the drive lever 2. A second expansion cam 34 connected to the drive lever 2 is inserted in a recess 79 of the expansion lever 71 and is supported through a spring 87 for adjusting the first wedge-shaped expansion cam 33.

The rotational bearing of the actuation discs or actuation levers in the embodiments of a bidirectional drive according to FIGS. 1 and 2 is replaced in this embodiment by an elastic connection in the form of an elastic web 76 which is formed through a recess 77 of the expansion lever 71. The expansion lever 71 is preferably a sintered part, a plastics moulded part or a stamped steel part and is mounted without play on the drive axis 10.

A spring strip 6 is likewise provided as a transfer device whose parallel angled spring ends 61, 62 are inserted in spring strip sockets 781, 782 of the expansion lever 71. During swivel movement of the drive lever 2 and the ensuing tilting movement of the expansion cams 33, 34 about a virtual axis lying outside of the drive axis 10 the expansion faces 72, 73 of the expansion lever 71 are forced apart, the spring strip 6 is widened and thus the swivel movement of the drive lever 2 is converted through entrainment of the drive wheel 1 into rotation of the drive wheel 1.

In order to pretension the expansion lever 71 a first resetting spring 85 is mounted between two arms 74, 75 of the expansion lever 71 and forces the arms 74, 75 apart so that the expansion faces 72, 73 thereby bear against the first expansion cam 33. A second resetting spring 86 bearing against the drive lever 2 and against a stop fixed locally or on the housing ensures that the drive lever 2 is returned to the neutral position once more after a swivel movement.

Figure 4:
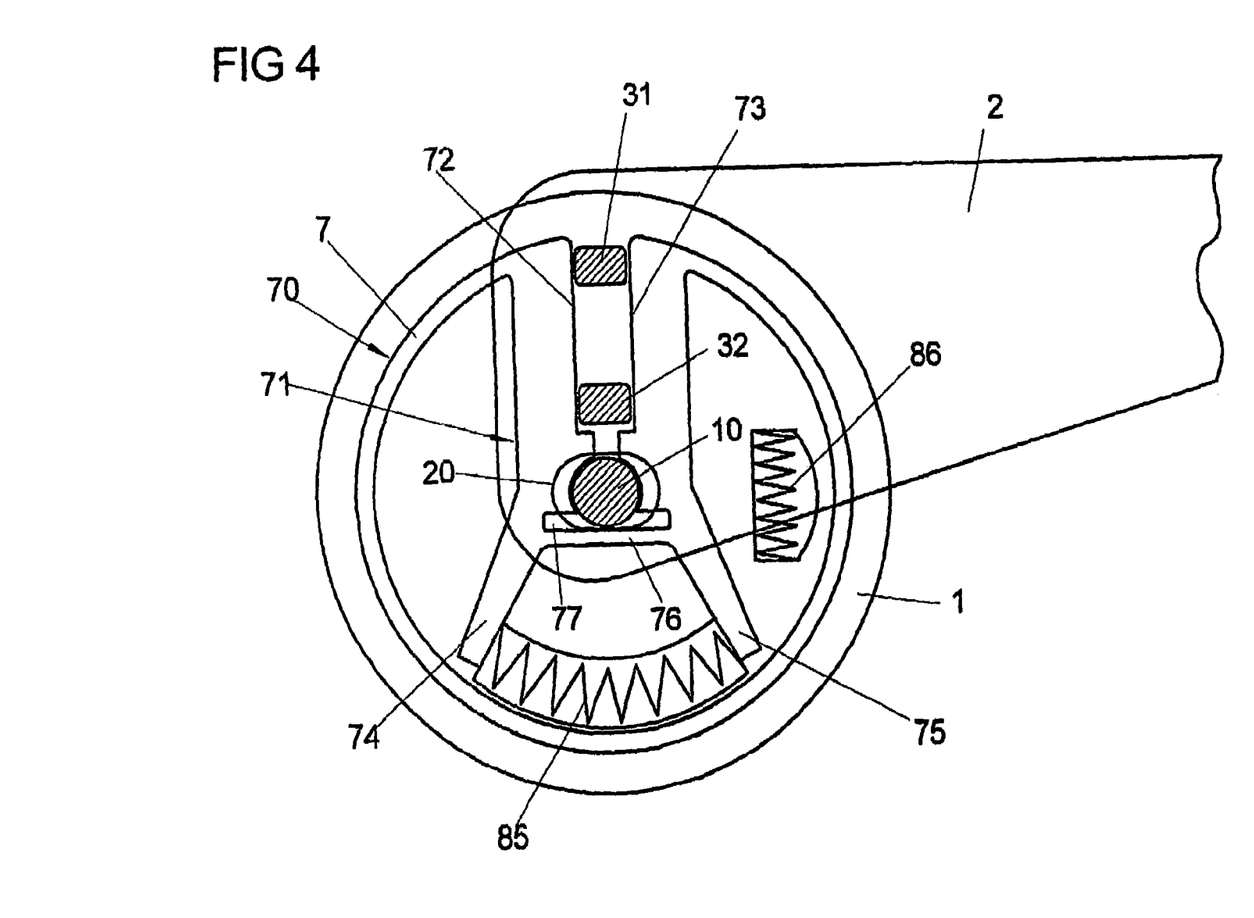
FIG. 4 is a sectional view of a bidirectional drive with an elastic shaped part with resilient circumferential face.

The sectional view of a bidirectional drive illustrated in FIG. 4 contains in place of a spring strip inserted in spring strip sockets of the expansion lever 71 a circumferential face 70 which is adapted to the cylindrical inner wall of the drive wheel 1 and forms together with the expansion lever 71 a shaped part 7 which is formed as a sintered part, a plastics moulded part or as a stamped steel part. The shaped part can be inserted without pretension into the cylindrical drive face of the drive wheel 1, can be manufactured cost-effectively, causes no tolerance problems and is mechanically very strong and thus durable.

Also in this design the expansion lever 71 is supported on the drive axis 10 and contains spaced expansion faces 72, 73 between which are mounted the expansion cams 31, 32 which are connected to the drive lever 2. The rotational bearing of the actuation discs 51, 52 or actuation levers 53, 54 in the embodiments of a bidirectional drive according to FIGS. 1 and 2 is in this embodiment replaced through an elastic connection in the form of an elastic web 76.

In order to pretension the shaped part 7 a first resetting spring 85 is mounted between two arms 74, 75 of the expansion lever 71 and forces the arms 74, 75 apart and consequently places the expansion faces 72, 73 against the expansion cams 32, 32 and lifts the circumferential face 70 of the shaped part 7 from the cylindrical inner wall of the drive wheel 1. If the drive lever 2 starting from the neutral position illustrated in FIG. 4 is swiveled into one or other direction then a tilting moment is exerted on the expansion cams 31, 32 which forces the expansion faces 72, 74 apart and thus presses the circumferential face 70 of the shaped part 7 against the cylindrical inside face of the drive wheel 1 so that during swivel movement of the drive lever 2 the drive wheel 1 is entrained and turned in the swivel direction of the drive lever 2. The oblong hole 20 with which the drive lever 2 is supported on the drive axis 10 thereby ensures free movement of the drive lever 2.

A second resetting spring 86 bearing against the drive lever 2 and against a stop fixed locally or on the housing ensures that the drive lever 2 is reset back in the neutral position after a swivel movement.

For the function of the embodiment illustrated in FIG. 4 it is not necessary for the expansion cams 31, 32 to be mounted on the same side in relation to the drive axis 10. Instead of this the expansion cam 32 can for example also engage between the drive axis 10 and the recess 77 into a corresponding opening of the cross web 71 so that a larger lever arm is provided for the drive cams 31, 32.

In the embodiments previously described and illustrated in FIGS. 1 to 4 the drive lever 2 is supported through an oblong hole 20 on the drive axis 10 to allow for the necessary play during the tilting movement of the expansion cams 31, 32 and 33,34. The oblong hole 20 however leads to a motion play of the drive lever 2 owing to the absence of centering of the drive lever 2.

On the other hand with the embodiments of a bidirectional drive described below and illustrated in FIGS. 5 and 6 the drive lever 2 is mounted without play on the drive axis and thus without any motion play.

Unlike the embodiments according to FIG. 4 the expansion cams 31, 32 are not connected directly to the drive lever 2 or parts of the drive lever 2 but are mounted on a reinforcement lever 41 which is attached for swivel movement to the drive lever 2 through a bolt 91. The drive lever 2 is mounted precisely on the drive axis 10 by a bore 21 adapted to the drive axis 10. An additional resetting spring 86 between the drive lever 2 and a bearing fixed locally or on the housing ensures precision centering of the drive lever 2.

During swivel movement of the drive lever 2 in the direction of the arrow S the reinforcement lever 41 is entrained in the direction of arrow V whereby the expansion cams 31, 32 are moved in the direction of arrows F1 and F2 so that the expansion faces 72, 73 are forced apart and thus the circumferential face 70 of the shaped part 7 is pressed against the cylindrical drive face of the drive wheel 1 to entrain the drive wheel 1 in the swivel direction S of the drive lever 2.

Similar to the embodiment of a bidirectional drive illustrated in FIG. 4 a first resetting spring 85 is mounted between the arms 74,75 of the expansion lever 71 of the shaped part 7 to reset the expansion lever 71 into its initial position which corresponds to the neutral position of the drive lever 2.

A second resetting spring 86 bearing against the drive lever 2 and a stop fixed locally or on the housing ensures that the drive lever 2 is reset back into the neutral position after a swivel movement.

The first resetting spring 85 ensures in particular that the shaped part 7 leads during resetting of the drive lever 2 at the end of a swivel movement of the drive lever 2 so that the expansion cams 31, 32 are reset into the initial position corresponding to the neutral position of the drive lever 2 and thus the expansion of the shaped part 7 is lifted which otherwise through the continuing contact of the circumferential face 70 of the shaped part 7 against the cylindrical drive face of the drive wheel 1 would lead to the drive wheel 1 rotating back.

Figure 5:
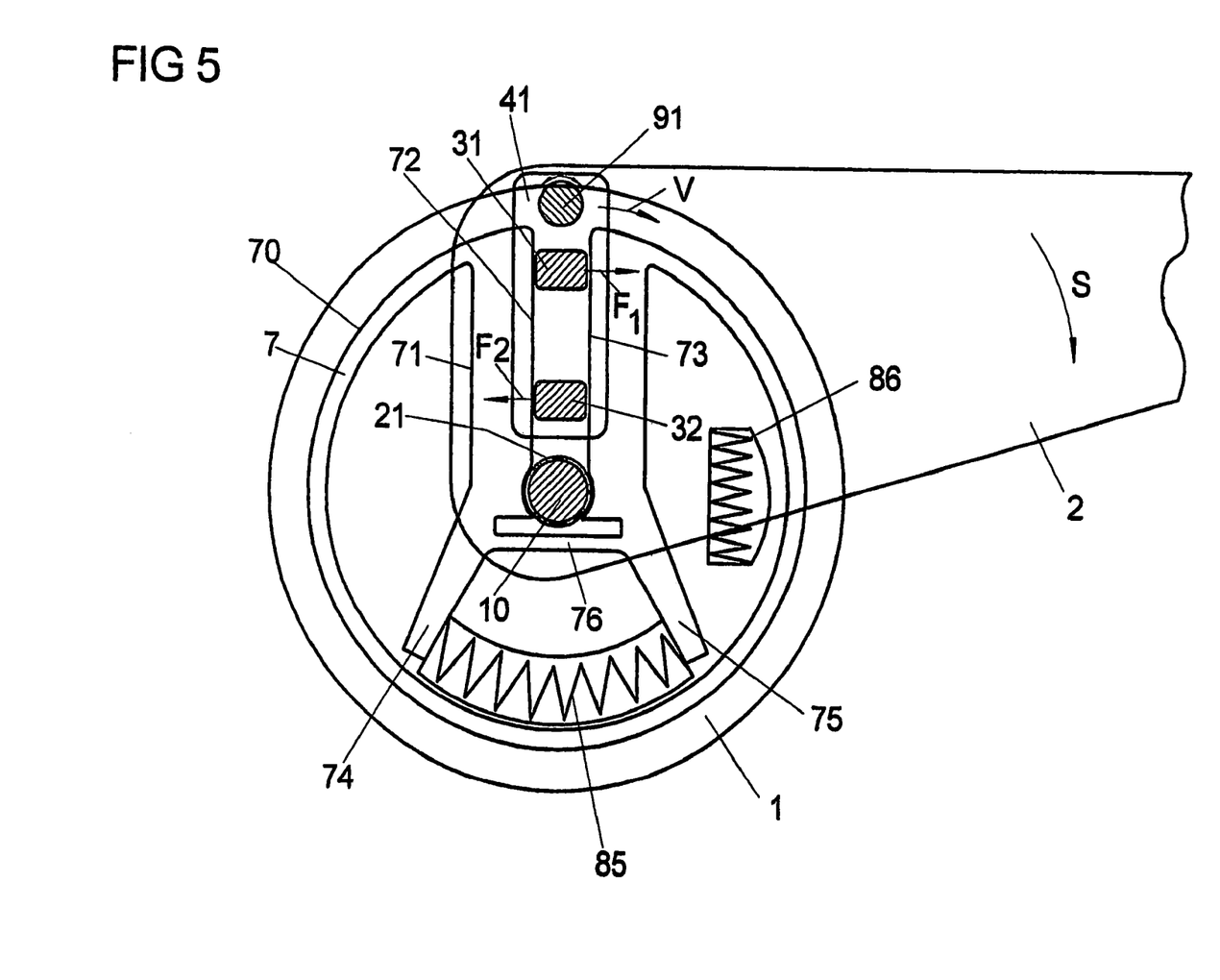
FIGS. 5/6 are sectional views of a bidirectional drive with a shaped part with resilient circumferential surface and a reinforcement lever.
Figure 6:
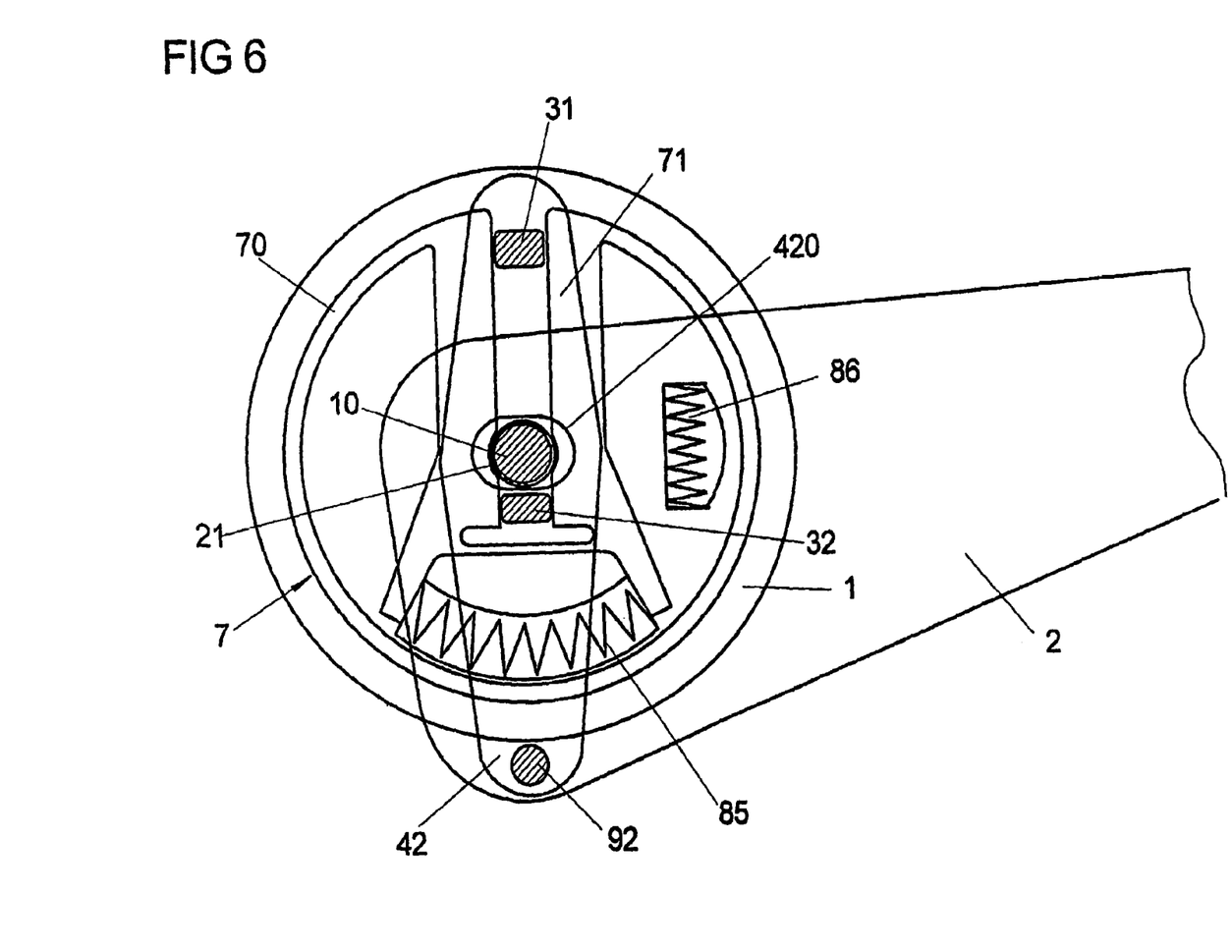

The sectional view of a bidirectional drive illustrated in FIG. 6 differs from the embodiment according to FIG. 5 in that the reinforcement lever 42 is extended beyond the drive axis 10, is attached at the end opposite the expansion 31 by a bolt 92 to the drive lever 2 which is mounted without play on the drive axis 10, and is supported by an oblong hole 420 on the drive axis 10. This embodiment enables the second expansion cam 32 to be mounted on the side opposite the first expansion cam 31 in relation to the drive axis 10 and thereby sets up a large lever arm for the tilting movement of the expansion cams 31,32.

The further structural parts of the bidirectional drive illustrated in FIG. 6 correspond to the structural parts and function of these structural parts for the embodiment illustrated in FIG. 5 and consequently are assigned the same reference numerals.

The invention claimed is:

1. A bidirectional drive for rotating a drive wheel connected to an adjusting device into one or other drive direction with a drive lever that swivels about a drive axis starting from a neutral position into one or other direction and which is connected to a coupling element for expanding a spring element which is supported at least in part on a cylindrical drive face of the drive wheel and entrains the drive wheel in a circumferential direction by forming a contact bearing against the cylindrical drive face when the drive lever is moved away from the neutral position whilst with a return of the drive lever into the neutral position the contact bearing of the spring element against the cylindrical drive face of the drive wheel is lifted and the drive wheel is not entrained, wherein the coupling element includes expansion cams which are mounted at different radial distances from the drive axis and which are able to tilt about an axis spaced from the drive axis and which expand actuation levers connected to the spring element so that the spring element bearing against the cylindrical drive face of the drive wheel is widened out.

2. The bidirectional drive according to claim 1, wherein at least one expansion cam is pretensioned and mounted radially displaceable between expansion faces of the actuation levers.

3. The bidirectional drive according to claim 2, wherein the pretensioned and radially displaceable expansion cam is wedge-shaped, is mounted between a first set of two contra wedge faces of the expansion faces of the actuation levers and is supported self-locking opposite the other expansion cam.

4. The bidirectional drive according to claim 3, wherein the other expansion cam is wedge-shaped with an oppositely aligned wedge shape to that of the one expansion cam and is tensioned between a second set of contra wedge faces of the actuation levers.

5. The bidirectional drive according to claim 4, wherein contact faces of the wedge-shaped expansion cams and the wedge faces of the actuation levers have a lower coefficient of friction than a reciprocal support of the wedge-shaped expansion cams.

6. The bidirectional drive according to claim 4 or 5, wherein the reciprocal support of the wedge-shaped expansion cams is formed wedge-shaped with a smaller wedge angle compared to a wedge angle included between the contact faces of the wedge-shaped expansion cams and the wedge faces of the actuation levers.

7. The bidirectional drive according to claim 1, wherein between the drive lever and a locally fixed stop on a housing of the bidirectional drive is a lever-resetting spring arranged to move the drive lever after swivel movement back into the neutral position.

8. The bidirectional drive according to claim 1, wherein the expansion cams are arranged on a reinforcement lever supported for swivel movement on the drive lever.

9. The bidirectional drive according to claim 8, wherein an attachment of the reinforcement lever on the drive lever is arranged radially aligned with the expansion cams.

10. The bidirectional drive according to claim 9, wherein an attachment of the reinforcement lever to the drive lever is provided on a same side in relation to the drive axis as the expansion cams.

11. The bidirectional drive according to claim 9, wherein an attachment of the reinforcement lever on the drive lever is mounted on a side of the reinforcement lever opposite one expansion cam in relation to the drive axis.

12. The bidirectional drive according to claim 8, wherein the drive lever is mounted substantially without play on the drive axis and that the reinforcement lever is mounted on the drive axis through an oblong hole.

13. The bidirectional drive according to claim 1, wherein the drive lever is attached to the drive axis through a bore adapted to a diameter of the drive axis.

14. A bidirectional drive for rotating a drive wheel connected to an adjusting device into one or other drive direction with a drive lever that swivels about a drive axis starting from a neutral position into one or other direction and which is connected to a coupling element for expanding a spring element which is supported at least in part on a cylindrical drive face of the drive wheel and entrains the drive wheel in a circumferential direction by forming a contact bearing against the cylindrical drive face when the drive lever is moved away from the neutral position whilst with a return of the drive lever into the neutral position the contact bearing of the spring element against the cylindrical drive face of the drive wheel is lifted and the drive wheel is not entrained, wherein the coupling element includes expansion cams which are able to tilt about an axis spaced from the drive axis and which expand actuation levers connected to the spring element so that the spring element bearing against the cylindrical drive face of the drive wheel is widened out, wherein the spring element comprises a spring strip whose ends are aligned parallel to each other and are inserted into sockets of the actuation levers.

15. The bidirectional drive according to claim 14, wherein the spring strip is pretensioned.

16. The bidirectional drive according to claim 14 or 15, wherein the actuation levers are disc-shaped and have a peripheral surface which is adapted at least in part to the cylindrical drive face of the drive wheel.

17. The bidirectional drive according to claim 14 or 15, wherein the actuation levers comprise a one-piece spring-elastic expansion lever which includes the expansion cams and drive axis and has on a side opposite the expansion cams in relation to the drive axis an elastic web which takes up tensile forces.

18. The bidirectional drive according to claim 17, comprising a shaped part containing both the expansion lever and a circumferential face adapted to the drive face of the drive wheel.

19. The bidirectional drive according to claim 18, wherein the shaped part comprises one of a stamped steel part, a plastics part and a sintered part and is insertable without pretension into a interior space of the drive wheel.

20. The bidirectional drive according to claim 14, wherein between the actuation levers are resetting springs arranged so that the actuation levers move the expansion cams after swivel movement of the drive lever back into an initial position corresponding to the neutral position of the drive lever.

21. The bidirectional drive according to claim 14 wherein the actuation levers comprise a one-piece spring-elastic expansion lever which includes the expansion cams and drive axis and has on a side opposite the expansion cams in relation to the drive axis an elastic web which takes up tensile forces and wherein resetting springs are arranged so that the expansion level moves the expansion cams after swivel movement of the drive lever back into an initial position corresponding to the neutral position of the drive lever.

22. A bidirectional drive for rotating a drive wheel connected to an adjusting device into one or other drive direction with a drive lever that swivels about a drive axis starting from a neutral position into one or other direction and which is connected to a coupling element for expanding a spring element which is supported at least in part on a cylindrical drive face of the drive wheel and entrains the drive wheel in a circumferential direction by forming a contact bearing against the cylindrical drive face when the drive lever is moved away from the neutral position whilst with a return of the drive lever into the neutral position the contact bearing of the spring element against the cylindrical drive face of the drive wheel is lifted and the drive wheel is not entrained, wherein the coupling element includes expansion cams which are able to tilt about an axis spaced from the drive axis and which expand actuation levers connected to the spring element so that the spring element bearing against the cylindrical drive face of the drive wheel is widened out, wherein the drive lever is attached to the drive axis by an oblong hole.

* * * * *